United States Patent
Wu et al.

(10) Patent No.: US 11,279,497 B2
(45) Date of Patent: Mar. 22, 2022

(54) GIMBAL ROTATION METHOD, GIMBAL, AIRCRAFT, AND METHOD AND SYSTEM FOR CONTROLLING ROTATION OF GIMBAL

(71) Applicant: SZ DJI TECHNOLOGY CO., LTD., Shenzhen (CN)

(72) Inventors: Yifan Wu, Shenzhen (CN); Huaiyu Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 136 days.

(21) Appl. No.: 16/725,559

(22) Filed: Dec. 23, 2019

(65) Prior Publication Data

US 2020/0130861 A1 Apr. 30, 2020

Related U.S. Application Data

(63) Continuation of application No. PCT/CN2017/095284, filed on Jul. 31, 2017.

(51) Int. Cl.
*B64D 47/00* (2006.01)
*B64D 47/08* (2006.01)
(Continued)

(52) U.S. Cl.
CPC ............ *B64D 47/08* (2013.01); *G01C 21/18* (2013.01); *G05D 1/0016* (2013.01);
(Continued)

(58) Field of Classification Search
CPC ...... B64D 47/08; G01C 21/18; G05D 1/0016; G05D 1/0816; G05D 3/12; B64C 39/024;
(Continued)

(56) References Cited

U.S. PATENT DOCUMENTS 8,521,428 B1    8/2013  Liccardo et al.
9,927,682 B2 *  3/2018  Fisher .................. G03B 15/006
(Continued)

FOREIGN PATENT DOCUMENTS

CN     105100714 A    11/2015
CN     105652891 A     6/2016
(Continued)

OTHER PUBLICATIONS

The World Intellectual Property Organization (WIPO) International Search Report for PCT/CN2017/095284 dated Apr. 27, 2018 6 pages.

*Primary Examiner* — Peter D Nolan
*Assistant Examiner* — Peter Y Ning
(74) *Attorney, Agent, or Firm* — Anova Law Group, PLLC

(57) ABSTRACT

A gimbal rotation method includes controlling a driving assembly based on an angle command indicating a target angle to drive a gimbal to rotate to the target angle in a first time period having a pre-set length, determining whether a new angle command is received within the first time period, (Continued)

and, if not, estimating an estimated target angle based on gimbal rotation angles indicated by a plurality of previously-received angle commands and controlling the driving assembly to drive the gimbal to rotate from the target angle to the estimated target angle in a second time period having the pre-set length.

20 Claims, 4 Drawing Sheets

(51) Int. Cl.
    *G01C 21/18*     (2006.01)
    *G05D 1/00*     (2006.01)
    *B64C 39/02*     (2006.01)
    *G05D 1/08*     (2006.01)

(52) U.S. Cl.
    CPC ...... *B64C 39/024* (2013.01); *B64C 2201/027* (2013.01); *B64C 2201/127* (2013.01); *B64C 2201/146* (2013.01); *G05D 1/0816* (2013.01)

(58) Field of Classification Search
    CPC ........ B64C 2201/027; B64C 2201/127; B64C 2201/146; F16M 13/02; F16M 11/123; F16M 11/18; G03B 17/561; G05B 2219/45071

See application file for complete search history.

(56) References Cited

U.S. PATENT DOCUMENTS

| | | | | |
|---|---|---|---|---|
| 2011/0304737 | A1* | 12/2011 | Evans | G01S 3/7864 |
| | | | | 348/169 |
| 2014/0049643 | A1* | 2/2014 | Segerstrom | F41G 3/145 |
| | | | | 348/144 |
| 2014/0270743 | A1* | 9/2014 | Webb | H04N 5/23248 |
| | | | | 396/55 |
| 2016/0171330 | A1* | 6/2016 | Mentese | G06T 7/20 |
| | | | | 348/170 |
| 2016/0352992 | A1* | 12/2016 | Saika | F16M 11/041 |
| 2017/0159875 | A1* | 6/2017 | Wagner | G03B 17/563 |
| 2018/0115716 | A1* | 4/2018 | Gubler | H04N 5/23258 |
| 2018/0135798 | A1* | 5/2018 | Griffin | G05B 6/02 |
| 2018/0146126 | A1* | 5/2018 | Tian | G02B 27/644 |
| 2019/0179216 | A1* | 6/2019 | Cao | G05D 3/00 |
| 2020/0130861 | A1* | 4/2020 | Wu | F16M 13/02 |

FOREIGN PATENT DOCUMENTS

| | | |
|---|---|---|
| CN | 105830129 A | 8/2016 |
| CN | 106249888 A | 12/2016 |
| CN | 106525074 A | 3/2017 |
| CN | 106742003 A | 5/2017 |

* cited by examiner

GIMBAL ROTATION METHOD, GIMBAL, AIRCRAFT, AND METHOD AND SYSTEM FOR CONTROLLING ROTATION OF GIMBAL

CROSS-REFERENCE TO RELATED APPLICATION

This application is a continuation of International Application No. PCT/CN2017/095284, filed on Jul. 31, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of gimbal control technology and, more particularly, to a gimbal rotation method, a gimbal, an aircraft, a method and a system for controlling rotation of a gimbal.

BACKGROUND

A gimbal is a supporting platform for holding and maintaining stability of a load at an aircraft. For example, the gimbal may be used to hold a photographing device such as a camera and a camcorder, etc., such that aerial photographing recording can be achieved.

When the gimbal receives a command for rotating the gimbal from an external device (e.g., a gimbal control device), the gimbal may be driven to rotate by a driving assembly. Generally, the commands are sent periodically. However, transmission of the commands is inevitably subject to adverse effects such as signal channel interference and process/thread scheduling of a general processor, causing the gimbal to receive the commands at uneven time intervals. In extreme cases, no new command is received in tens of milliseconds and then multiple commands are received in a few milliseconds. In the specification, this scenario is referred to as "transmission jitter." The transmission jitter of the commands may cause delaying and buffering of the rotation of the gimbal, thereby affecting user experience.

Currently, a rotation time (also known as "gimbal sensitivity") is configured to specify how much time it takes for the gimbal to rotate to an angle indicated in the received command. As a result, the gimbal does not does not rotate to the angle indicated in the received command as soon as possible. Instead, the driving assembly controls the rotation speed of the gimbal rotation, such that the gimbal rotates to the angle indicated in the received command until the specified rotation time expires, thereby solving the problems of delaying and buffering of the rotation of the gimbal when the commands are not timely received in the specified rotation time. However, in practical applications, it is impossible to configure the rotation time indicating the gimbal sensitivity to be greater than all time intervals between the received commands. Due to unpredictability of the transmission jitter of the commands, the time intervals between the commands received by the gimbal are unpredictable. In this case, configuring the substantially large rotation time will cause substantially slow rotation of the gimbal and inefficiency. Thus, under the circumstance that the time intervals between the commands received by the gimbal due to the transmission jitter of the commands exceed the rotation time indicated by a pre-set gimbal sensitivity, the problems of delaying and buffering of the rotation of the gimbal cannot be solved by configuring the gimbal sensitivity.

SUMMARY

In accordance with the disclosure, there is provided a gimbal rotation method including controlling a driving assembly based on an angle command indicating a target angle to drive a gimbal to rotate to the target angle in a first time period having a pre-set length, determining whether a new angle command is received within the first time period, and, if not, estimating an estimated target angle based on gimbal rotation angles indicated by a plurality of previously-received angle commands and controlling the driving assembly to drive the gimbal to rotate from the target angle to the estimated target angle in a second time period having the pre-set length.

Also in accordance with the disclosure, there is provided a gimbal including a transceiver configured to receive an angle command indicating a target angle, a processor, and a memory storing computer executable instructions that, when being executed by the processor, cause the processor to control a driving assembly based on the angle command to drive the gimbal to rotate to the target angle in a first time period having a pre-set length, determine whether a new angle command is received within the first time period, and, if not, estimate an estimated target angle based on gimbal rotation angles indicated by a plurality of previously-received angle commands and control the driving assembly to drive the gimbal to rotate from the target angle to the estimated target angle in a second time period having the pre-set length.

Also in accordance with the disclosure, there is provided a gimbal rotation control system including a control device and an aircraft including a gimbal. The control device includes a control device transceiver configured to send an angle command indicating a target angle. The gimbal includes a gimbal transceiver configured to receive the angle command, a gimbal processor, and a gimbal memory storing instructions that, when being executed by the gimbal processor, cause the gimbal processor to control a driving assembly based on the angle command to drive the gimbal to rotate to the target angle in a first time period having a pre-set length, determine whether a new angle command is received within the first time period, and, if not, estimate an estimated target angle based on gimbal rotation angles indicated by a plurality of previously-received angle commands and control the driving assembly to drive the gimbal to rotate from the target angle to the estimated target angle in a second time period having the pre-set length.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person

DETAILED DESCRIPTION OF THE EMBODIMENTS

Figure 1:
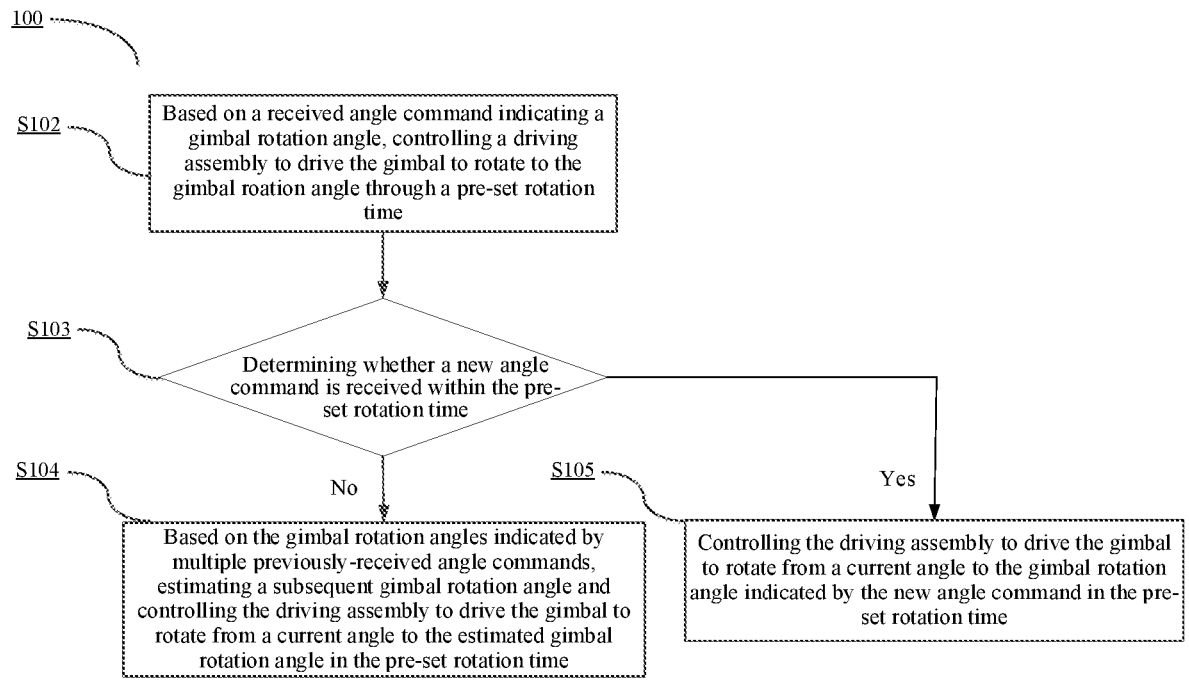
FIG. 1 is a flowchart of a gimbal rotation method according to an example embodiment of the present disclosure.

Embodiments of the present disclosure are described in detail below with reference to the accompanying drawings. Same or similar reference numerals in the drawings represent the same or similar elements or elements having the same or similar functions throughout the specification. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Hereinafter, with reference to FIG. 1, a rotation method performed at a gimbal according to an example embodiment of the present disclosure will be described.

FIG. 1 is a flowchart of a gimbal rotation method according to an example embodiment of the present disclosure. As shown in FIG. 1, at S102, based on a received angle command (also referred to as a "current angle command") indicating a gimbal rotation angle (also referred to as a "target angle"), the gimbal controls a driving assembly to drive the gimbal to rotate to the gimbal rotation angle (i.e., to the target angle indicated by the current angle command) in a pre-set rotation time (a time period for rotation that has a pre-set length). In the specification, the rotation time it takes for the gimbal to rotate to the gimbal rotation angle indicated in the received angle command, i.e., the pre-set length, is referred to as a "gimbal sensitivity," which is characterized by an amount of time.

In some embodiments, the angle command is sent by a control device controlling the gimbal. For example, the control device may include, but is not limited to, a smart wearable device (e.g., controlling the gimbal through motion sensing), a portable electronic device, or a remote-control joystick. In some other embodiments, the angle command is sent by a flight controller of an aircraft where the gimbal is located. However, the present disclosure does not limit which entity sends the angle command, and any entity that can send the angle command is applicable to the technical solutions of the present disclosure.

In some embodiments, the gimbal rotation angle indicated by the angle command is obtained by sampling attitude data of the control device measured by an inertial measurement unit (IMU) at a pre-set sampling interval and performing a calculation on the sampled current attitude data and attitude data of a reference point.

In some embodiments, the attitude data includes yaw/pitch/roll components.

In some embodiments, the gimbal driving assembly is an electric motor configured to drive the gimbal to rotate. However, the present disclosure is not intended to limit the implementation of the driving assembly. Any driving assembly that can drive the gimbal to rotate is applicable to the technical solutions of the present disclosure.

In some embodiments, the gimbal sensitivity is configured in advance by the gimbal based on the statistics of intervals of multiple previously-received angle commands. In some embodiments, the gimbal sensitivity is configured in advance by the control device based on the statistics provided by the gimbal.

Specifically, the statistics are collected with respect to the intervals of the multiple angle commands historically received by the gimbal in presence of transmission jitter during the command transmission under a typical condition of a specific aircraft model where the gimbal is located.

In some embodiments, if a pre-set percent of the intervals (e.g., a pre-set number of intervals out of a total number of intervals) fall within a pre-set time, the gimbal sensitivity is set to be the maximum one of the pre-set time and a sum of a pre-set margin and an interval of sampling by the control device on the IMU measurement (also referred to as an "IMU sampling interval").

For example, assuming that the pre-set margin is 10 milliseconds and the statistics show that 80% of the intervals (denoted as duration_80) of the angle commands are within 30 milliseconds, i.e., duration_80=30 ms, then the gimbal sensitivity (denoted as motion_time) can be set according to the following equation:

motion_time=max(10 ms+IMU sampling interval, duration_80).

In some embodiments, the pre-set margin is set according to the signal channel interference between the control device and the aircraft where the gimbal is located, and the transmission and processing performance of multiple intermediate circuits between the IMU and the gimbal.

Figure 2:
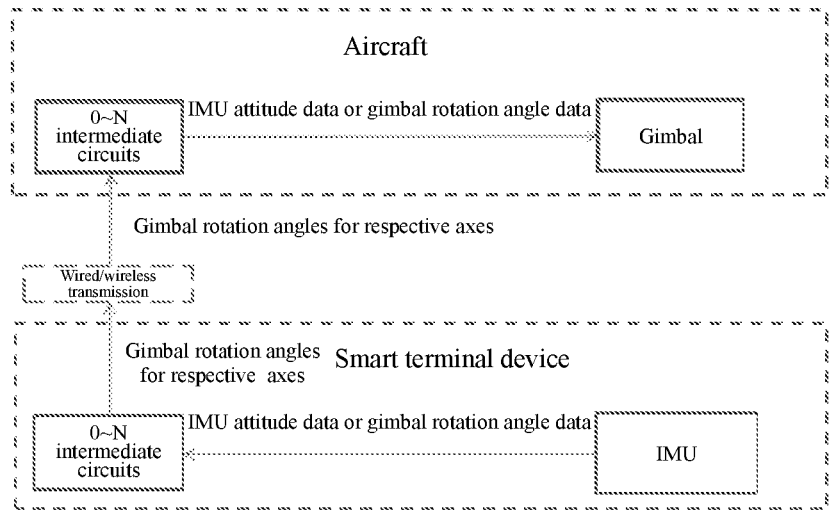
FIG. 2 is a schematic diagram of data transmission flow between an IMU of a control device and a gimbal of an aircraft according to an example embodiment of the present disclosure.

FIG. 2 is a schematic diagram of data transmission flow between an IMU of a control device and a gimbal of an aircraft according to an example embodiment of the present disclosure. As shown in FIG. 2, the wired transmission between the IMU of the control device and the 0-N intermediate circuits (including, but are not limited to a general-purpose processor, a wired transmission circuit, a wireless transmission circuit), the wired or wireless transmission between the control device and the aircraft, the wired transmission between the 0-N intermediate circuits of the aircraft and the gimbal, and the processing performance of all circuits are factors contributing to the transmission jitter of the angle commands, and are affecting the intervals of receiving the angle commands by the gimbal. Thus, the pre-set margin is configured by considering the above factors.

At S103, the gimbal determines whether a new angle command is received within a rotation time represented by the gimbal sensitivity.

If it is determined that no new angle command is received within the rotation time, the method 100 proceeds to S104. The gimbal estimates a subsequent gimbal rotation angle (an "estimated target angle") based on the gimbal rotation angles indicated by multiple previously-received angle commands and controls the driving assembly to drive the gimbal to rotate from a current angle to the estimated gimbal rotation angle in the rotation time, i.e., to rotate from an angle at the end of the current time period for rotation to the estimated gimbal rotation angle in another time period for rotation having the pre-set length.

The estimation of the gimbal rotation angle is described in detail below with reference to an example algorithm. However, those skilled in the art should understand that the example algorithm is merely intended to be illustrative and not restrictive.

For example, a frequency for the control device to send the angle commands is denoted as a constant FREQ Hz and three gimbal rotation angles indicated by the three most recently received angle commands are denoted as $angle_n$, $angle_{n-1}$, $angle_{n-2}$, respectively, and $$angle_n = \begin{bmatrix} pitch_n \\ roll_n \\ yaw_n \end{bmatrix},$$

$$angle_n = \begin{bmatrix} pitch_{n-1} \\ roll_{n-1} \\ yaw_{n-1} \end{bmatrix},$$

$$angle_{n-2} = \begin{bmatrix} pitch_{n-2} \\ roll_{n-2} \\ yaw_{n-2} \end{bmatrix}.$$

Based on the above information, calculation may be performed to obtain an interval PERIOD of sending the angle commands, an angular velocity $angleVel_x$ corresponding to each gimbal rotation angle, and an angular acceleration $angleAccel_x$ corresponding to each gimbal rotation angle by the following equations:

PERIOD=1/FREQ, $angleVel_n$=($angle_n$-$angle_{n-1}$)*FREQ, $angleVel_{n-1}$=($angle_{n-1}$-$angle_{n-2}$)*FREQ, $angleAccel_n$=($angleVel_n$-$angleVel_{n-1}$)*FREQ.

As such, the subsequent gimbal rotation angle $angle_{n+1}$ is estimated by the following equation:

$angle_{n+1}$=$angle_n$+$angleVel_n$*PERIOD+ $angleAccel_n$*PERIOD$^2$/2.

It should be noted that the present disclosure is not intended to limit the algorithm for estimating the gimbal rotation angle, and any suitable estimation algorithm is applicable to the technical solutions of the present disclosure.

If it is determined that a new angle command is received within the rotation time, the method 100 proceeds to S105. The gimbal controls the driving assembly to drive the gimbal to rotate from a current angle (i.e., the angle of the gimbal at the time of receiving the new angle command) to the gimbal rotation angle (a "new target angle") indicated by the new angle command in the rotation time.

Figure 3:
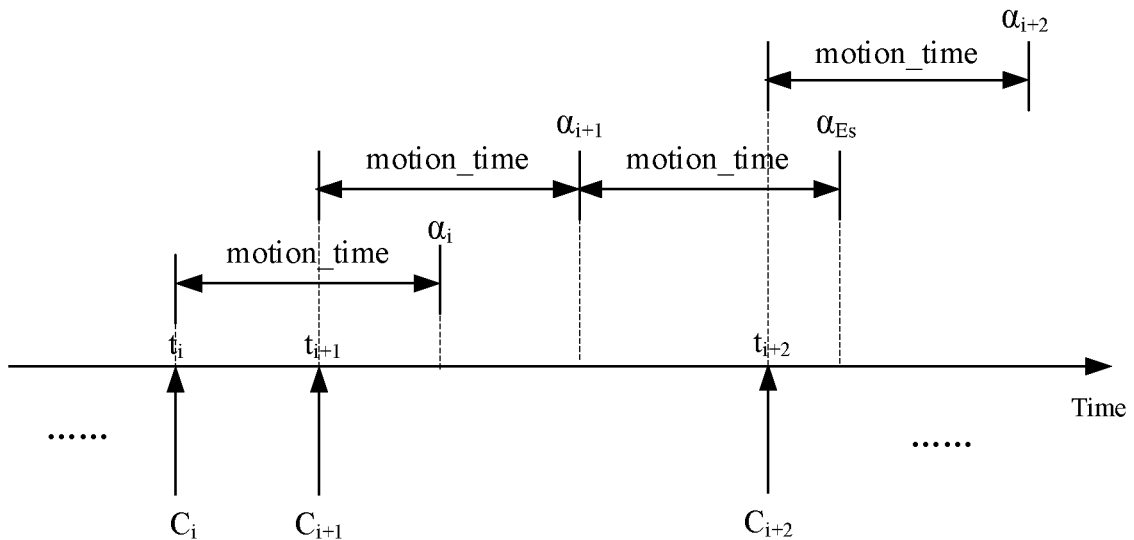
FIG. 3 is a timing diagram of rotating the gimbal illustrating cases when an angle command is received or is not received within a rotation time represented by a pre-set gimbal sensitivity according to an example embodiment of the present disclosure.

FIG. 3 is a timing diagram of rotating the gimbal illustrating cases when an angle command is received or is not received within a rotation time represented by a pre-set gimbal sensitivity according to an example embodiment of the present disclosure. It should be understood that the examples shown in FIG. 3 are merely illustrative and not restrictive.

As shown in FIG. 3, the gimbal receives the angle command $C_i$ at the time $t_i$ instructing the gimbal to rotate to $\alpha_i$ and receives the angle command $C_{i+1}$ at the time $t_{i+1}$ instructing the gimbal to rotate to $\alpha_{i+1}$. The interval between $t_i$ and $t_{i+1}$ is smaller than motion_time. That is, the new angle command $C_{i+1}$ is received within motion_time. Thus, the gimbal controls the driving assembly to drive the gimbal to rotate from the angle at the time $t_{i+1}$ to the angle $\alpha_{i+1}$ indicated by the angle command $C_{i+1}$, starting from the time $t_{i+1}$ when the angle command $C_{i+1}$ is received and continuing through the entire motion_time. No new angle command is received within the entire motion_time during which the gimbal rotates to the angle $\alpha_{i+1}$. At the end of this period of motion_time, i.e., at the time the gimbal rotates to the angle $\alpha_{i+1}$, the gimbal estimates the subsequent gimbal rotation angle $\alpha_{Es}$ based on the gimbal rotation angles indicated by multiple previously-received angle commands and controls the driving assembly to drive the gimbal to rotate from the current angle $\alpha_{i+1}$ to the estimated gimbal rotation angle $\alpha_{Es}$, starting from the time ($t_{i+1}$+motion_time) and continuing through the entire motion_time. If the new angle command $C_{i+2}$ indicating the gimbal rotation angle $\alpha_{i+2}$ is received at the time $t_{i+2}$ before the end of the entire motion_time, i.e., before the gimbal rotates to the estimated gimbal rotation angle $\alpha_{Es}$, as previously described, the gimbal controls the driving assembly to drive the gimbal to rotate from the current angle at the time $t_{i+2}$ to the gimbal rotation angle $\alpha_{i+2}$ indicated by the angle command $C_{i+2}$, starting from the time $t_{i+2}$ when the angle command $C_{i+2}$ is received and continuing through the entire motion_time.

Figure 4:
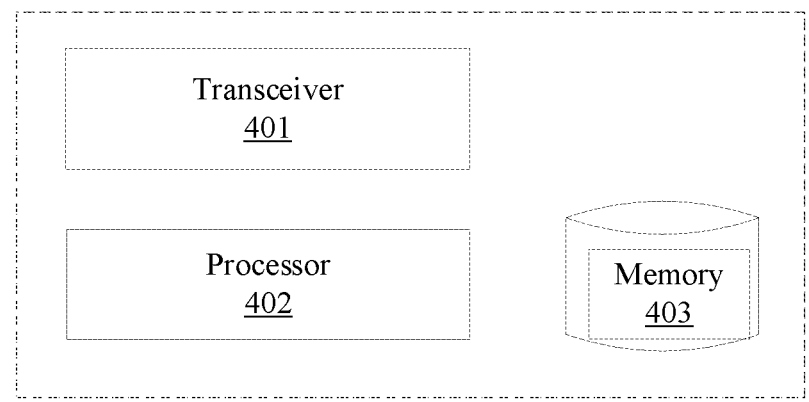
FIG. 4 is a structural block diagram of a gimbal according to an example embodiment of the present disclosure.

With reference to FIG. 4, the gimbal structure is described below. FIG. 4 is a structural block diagram of a gimbal according to an example embodiment of the present disclosure. The gimbal 400 can be used to perform the method 100 shown in FIG. 1. For the purpose of brevity, only the gimbal structure is described in detail below while certain details described in the method 100 shown in FIG. 1 are omitted and may be referred to the description of the method 100.

As shown in FIG. 4, the gimbal 400 includes a transceiver 401 configured to receive the angle command indicating the gimbal rotation angle from the control device, a processing unit or a processor 402 configured to execute various processes of the method, and a memory 403 configured to store computer executable instructions. The processor 402 may be a single processing unit or a combination of a plurality of processing units.

In some embodiments, the gimbal 400 performs the method 100. When being executed by the processor 402, the instructions cause the processor 402 to perform the following operations: based on the received angle command, controlling the driving assembly to drive the gimbal to rotate to the gimbal rotation angle in a pre-set rotation time, determining whether a new angle command is received within the pre-set rotation time, and if no new angle command is received within the pre-set rotation time, estimating the subsequent gimbal rotation angle based on the gimbal rotation angles indicated by multiple previously-received angle commands and controlling the driving assembly to drive the gimbal to rotate from the current angle to the estimated gimbal rotation angle in the pre-set rotation time.

In some embodiments, when being executed by the processor 402, the instructions cause the processor 402 to perform the following operations: if the new angle command is received within the pre-set rotation time, controlling the driving assembly to drive the gimbal to rotate from the current angle (at the time of receiving the new angle command) to the gimbal rotation angle indicated by the new angle command in the pre-set rotation time (i.e., in another period of time for rotation having the pre-set length).

Those skilled in the art can understand that an aircraft including the gimbal 400 capable of performing the method 100 described with reference to FIG. 1 also falls within the scope of the present disclosure.

Hereinafter, with reference to FIG. 5, a gimbal rotation method according to the embodiments of the present disclosure will be described.

Figure 5:
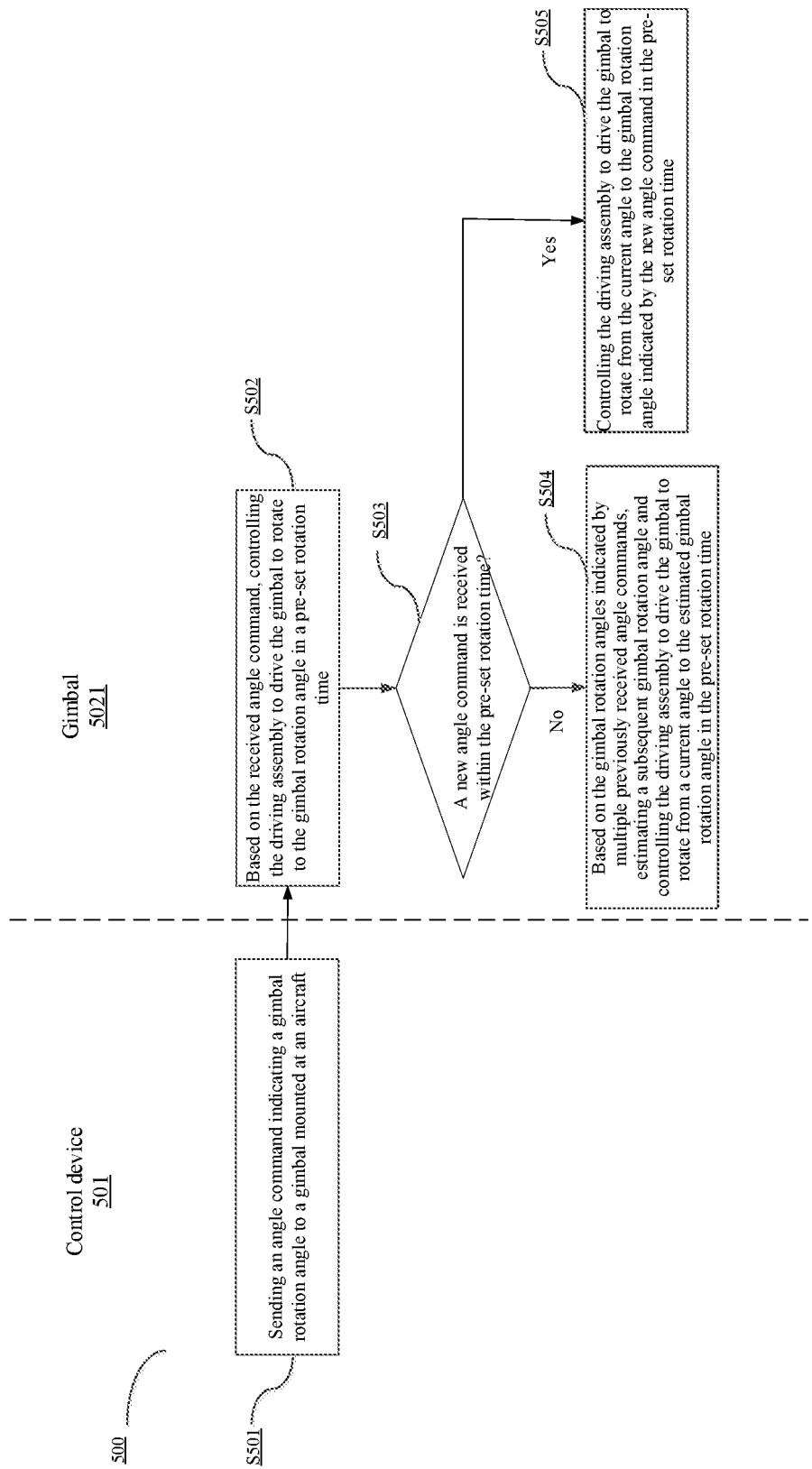
FIG. 5 is a flowchart of a gimbal rotation method according to another example embodiment of the present disclosure.

FIG. 5 is a flowchart of a gimbal rotation method according to another example embodiment of the present disclosure. For the purpose of brevity, the details already described in the method 100 with reference to FIG. 1 are omitted and reference may be made to the description of the method 100.

At S501, a control device 501 sends an angle command indicating a gimbal rotation angle to a gimbal 5021 mounted at an aircraft.

In some embodiments, the control device 501 samples attitude data of the control device 501 measured by an IMU at a sampling interval and, based on the sampled current attitude data and the attitude data of a reference point, calculates a gimbal rotation angle.

In some embodiments, the attitude data includes yaw/pitch/roll components.

At S502, based on the received angle command, the gimbal 5021 controls the driving assembly to drive the gimbal 5021 rotate to the gimbal rotation angle in a pre-set rotation time.

At S503, the gimbal 5021 determines whether a new angle command is received within the pre-set rotation time.

If no new angle command is received within the pre-set rotation time, the method 500 proceeds to S504. Based on the gimbal rotation angles indicated by multiple previously-received angle commands, the gimbal 5021 estimates a subsequent gimbal rotation angle and controls the driving assembly to drive the gimbal 5021 to rotate from a current angle to the estimated gimbal rotation angle in the pre-set rotation time.

If the new angle command is received within the pre-set rotation time, the method 500 proceeds to S505. The gimbal 5021 controls the driving assembly to drive the gimbal 5021 to rotate from the current angle to the gimbal rotation angle indicated by the new angle command in the pre-set rotation time.

Figure 6:
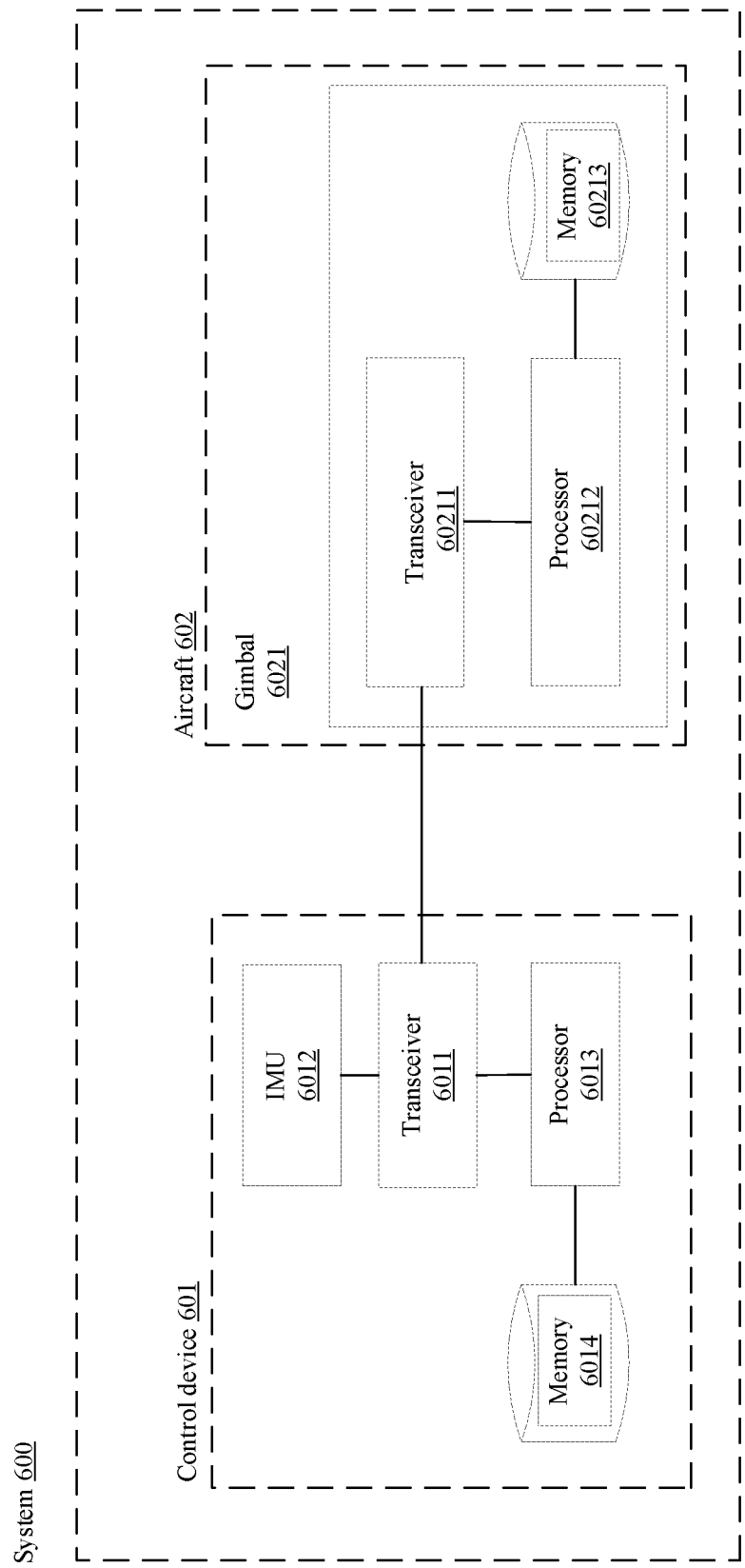
FIG. 6 is a structural block diagram of a system for controlling rotation of a gimbal according to another example embodiment of the present disclosure.

Hereinafter, with reference to FIG. 6, a gimbal rotation control system according to the embodiments of the present disclosure will be described. FIG. 6 is a structural block diagram of a system for controlling rotation of a gimbal according to another example embodiment of the present disclosure. For the purpose of brevity, the structure of the system 600 is schematically described in the embodiments below while certain details described in the method 100 shown in FIG. 1 and in the method 500 shown in FIG. 5 are omitted and reference may be made to the description of the method 100 and the method 500.

As shown in FIG. 6, the system 600 includes a control device 601 and an aircraft 602.

The control device 601 includes a transceiver 6011 configured to send the angle command indicating the gimbal rotation angle to a gimbal 6021 of the aircraft 602, an IMU 6012 configured to measure attitude data of the control device 601, a processing unit or a processor 6013 configured to execute various processes of a disclosed method, and a memory 6014 configured to store computer executable instructions. The processor 6013 may be a single processing unit or a combination of a plurality of processing units. When being executed by the processor 6013, the instructions cause the processor 6013 to perform the following operations: sampling the attitude data of the control device 601 measured by the IMU 6012 at the sampling interval and, based on the sampled current attitude data and the attitude data of a reference point, calculating the gimbal rotation angle.

The aircraft 602 includes the gimbal 6021. Further, the gimbal 6021 includes a transceiver 60211 configured to receive the angle command indicating the gimbal rotation angle from the control device 601, a processing unit or a processor 60212 configured to execute various processes of a disclosed method, and a memory 60213 configured to store computer executable instructions. The processor 60212 may be a single processing unit or a combination of a plurality of processing units. When being executed by the processor 60212, the instructions cause the processor 60212 to perform the following operations: based on the received angle command, controlling the driving assembly to drive the gimbal 6021 to rotate to the gimbal rotation angle in a pre-set rotation time, determining whether a new angle command is received within the pre-set rotation time, and if no new angle command is received within the pre-set rotation time, estimating the subsequent gimbal rotation angle based on the gimbal rotation angles indicated by multiple previously-received angle commands and controlling the driving assembly to drive the gimbal 6021 to rotate from the current angle to the estimated gimbal rotation angle through the pre-set rotation time.

In some embodiments, when being executed by the processor 60212, the instructions cause the processor 60212 to perform the following operations: if the new angle command is received within the pre-set rotation time, controlling the driving assembly to drive the gimbal 6021 to rotate from the current angle to the gimbal rotation angle indicated by the new angle command in the pre-set rotation time.

The program running on the disclosed device may be a program that controls a central processing unit (CPU) to cause a computer to implement the functions of the embodiments of the present disclosure. The program or information processed by the program may be temporarily stored in a volatile memory (e.g., a random-access memory or RAM), a hard disk drive (HDD), a non-volatile memory (e.g., a flash memory), or other suitable memory systems.

The program for implementing the functions of the embodiments of the present disclosure may be stored on a computer-readable storage medium. Corresponding functions may be implemented by causing a computer system to retrieve the program stored on the storage medium and to execute the retrieved program. The so-called "computer system" herein may be a computer system embedded in the disclosed device, and may include an operating system or hardware (e.g., a peripheral device). "The computer-readable storage medium" may be a semiconductor storage medium, an optical storage medium, a magnetic storage medium, a storage medium for a short-term dynamic storage program, or any other computer-readable storage medium.

Various features or function modules (or circuits) of the device in the embodiments of the present disclosure may be implemented or executed by circuits (e.g., a single chip or multiple integrated circuits). Circuits designed to perform the functions described in the specification may include a general-purpose processor, a digital signal processor (DSP), an application specific integrated circuit (ASIC), a field programmable gate array (FPGA), other programmable logic devices, discrete gates or transistor logic, discrete hardware components, or any combination thereof. The general-purpose processor may be a microprocessor, or any existing processor, controller, microcontroller, or state machine. The circuits may be digital circuits or analog circuits. When new integrated circuits replacing the existing integrated circuits appear due to advances in the semiconductor technology, one or more embodiments of the present disclosure may also be implemented by using the new integrated circuits.

Various embodiments of the present disclosure are merely used to illustrate the technical solution of the present disclosure, but the scope of the present disclosure is not limited thereto. Although the present disclosure has been described in detail with reference to the foregoing embodiments, those skilled in the art should understand that the technical solution described in the foregoing embodiments can still be modified or some or all technical features can be equivalently replaced. Without departing from the spirit and principles of the present disclosure, any modifications, equivalent substitutions, and improvements, etc. shall fall within the scope of the present disclosure. Thus, the scope of present invention should be determined by the appended claims.

What is claimed is:

1. A gimbal rotation method comprising:
based on an angle command indicating a target angle received from a control device controlling a gimbal, controlling a driving assembly to drive the gimbal to rotate to the target angle in a first time period having a pre-set length;
determining whether a new angle command indicating a new target angle is received within the first time period; and
in response to determining that no new angle command is received within the first time period:
estimating an estimated target angle based on gimbal rotation angles indicated by a plurality of previously-received angle commands; and
controlling the driving assembly to drive the gimbal to rotate from the target angle to the estimated target angle in a second time period having the pre-set length.

2. The method of claim 1, further comprising:
in response to receiving the new angle command within the first time period, controlling the driving assembly to drive the gimbal to rotate from a current angle to the new target angle indicated by the new angle command in a third time period having the pre-set length, the current angle being an angle of the gimbal at a time of receiving the new angle command.

3. The method of claim 1, wherein the pre-set length is set, by the gimbal or the control device controlling the gimbal, based on statistics of intervals of the plurality of previously-received angle commands.

4. The method of claim 3, wherein:
a pre-set percent of the intervals fall within a pre-set time; and
the pre-set length is set to be a maximum one of:
a sum of a sampling interval by the control device sampling on measurements by an inertial measurement unit (IMU) and a pre-set margin, and
the pre-set time.

5. The method of claim 4, wherein the pre-set margin is set according to a signal channel interference between the control device and an aircraft carrying the gimbal, and a transmission and processing performance of intermediate circuits between the IMU and the gimbal.

6. The method of claim 3, wherein the control device includes a smart wearable device, a portable electronic device, or a remote-control joystick.

7. A gimbal comprising:
a transceiver configured to receive an angle command indicating a target angle from a control device controlling the gimbal;
a processor; and
a memory storing computer executable instructions that, when being executed by the processor, cause the processor to:
based on the angle command, control a driving assembly to drive the gimbal to rotate to the target angle in a first time period having a pre-set length;
determine whether a new angle command indicating a new target angle is received within the first time period; and
in response to determining that no new angle command is received within the first time period:
estimate an estimated target angle based on gimbal rotation angles indicated by a plurality of previously-received angle commands; and
control the driving assembly to drive the gimbal to rotate from the target angle to the estimated target angle in a second time period having the pre-set length.

8. The gimbal of claim 7, wherein the instructions further cause the processor to, in response to receiving the new angle command within the first time period, control the driving assembly to drive the gimbal to rotate from a current angle to the new target angle indicated by the new angle command in a third time period having the pre-set length, the current angle being an angle of the gimbal at a time of receiving the new angle command.

9. The gimbal of claim 7, wherein the pre-set length is set, by the gimbal or the control device controlling the gimbal, based on statistics of intervals of the plurality of previously-received angle commands.

10. The gimbal of claim 9, wherein:
a pre-set percent of the intervals fall within a pre-set time; and
the pre-set length is set to be a maximum one of:
a sum of a sampling interval by the control device sampling on measurements by an inertial measurement unit (IMU) and a pre-set margin, and
the pre-set time.

11. The gimbal of claim 10, wherein the pre-set margin is set according to a signal channel interference between the control device and an aircraft carrying the gimbal, and a transmission and processing performance of intermediate circuits between the IMU and the gimbal.

12. The gimbal of claim 9, wherein the control device includes a smart wearable device, a portable electronic device, or a remote-control joystick.

13. A gimbal rotation control system comprising:
a control device including a control device transceiver configured to send an angle command indicating a target angle; and an aircraft including a gimbal, the gimbal including:
- a gimbal transceiver configured to receive the angle command from the control device;
- a gimbal processor; and
- a gimbal memory storing instructions that, when being executed by the gimbal processor, cause the gimbal processor to:
  - based on the angle command, control a driving assembly to drive the gimbal to rotate to the target angle in a first time period having a pre-set length;
  - determine whether a new angle command indicating a new target angle is received within the first time period; and
  - in response to determining that no new angle command is received within the first time period:
    - estimate an estimated target angle based on gimbal rotation angles indicated by a plurality of previously-received angle commands; and
    - control the driving assembly to drive the gimbal to rotate from the target angle to the estimated target angle in a second time period having the pre-set length.

14. The system of claim 13, wherein the instructions further cause the gimbal processor to, in response to receiving the new angle command within the first time period, control the driving assembly to drive the gimbal to rotate from a current angle to the new target angle indicated by the new angle command in a third time period having the pre-set length, the current angle being an angle of the gimbal at a time of receiving the new angle command.

15. The system of claim 13, wherein the control device further includes:
- an inertial measurement unit (IMU) configured to measure attitude data of the control device;
- a control device processor; and
- a control device memory storing instructions that, when being executed by the control device processor, cause the control device processor to:
  - sample the attitude data of the control device measured by the IMU at a sampling interval; and
  - based on the sampled current attitude data and attitude data of a reference point, calculate the target angle.

16. The system of claim 15, wherein the attitude data includes yaw, pitch, and roll components.

17. The system of claim 13, wherein the pre-set length is set, by the gimbal or the control device controlling the gimbal, based on statistics of intervals of the plurality of previously-received angle commands.

18. The system of claim 17, wherein:
- a pre-set percent of the intervals fall within a pre-set time; and
- the pre-set length is set to be a maximum one of:
  - a sum of a sampling interval by the control device sampling on measurements by an inertial measurement unit (IMU) and a pre-set margin, and
  - the pre-set time.

19. The system of claim 18, wherein the pre-set margin is set according to a signal channel interference between the control device and an aircraft carrying the gimbal, and a transmission and processing performance of intermediate circuits between the IMU and the gimbal.

20. The system of claim 13, wherein the control device includes a smart wearable device, a portable electronic device, or a remote-control joystick.

* * * * *